United States Patent
Hopmann et al.

(10) Patent No.: US 9,075,661 B2
(45) Date of Patent: Jul. 7, 2015

(54) PLACING OBJECTS ON HOSTS USING HARD AND SOFT CONSTRAINTS

(75) Inventors: Alexander Hopmann, Seattle, WA (US); Marc Keith Windle, Surrey (CA); Patrick Simek, Redmond, WA (US); Erick Raymundo Lerma, Bothell, WA (US); Dan Rosenthal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 764 days.

(21) Appl. No.: 12/908,681

(22) Filed: Oct. 20, 2010

(65) Prior Publication Data

US 2012/0102199 A1    Apr. 26, 2012

(51) Int. Cl.
  *G06F 15/173*  (2006.01)
  *G06F 9/50*  (2006.01)
  *G06F 9/455*  (2006.01)

(52) U.S. Cl.
  CPC ............ *G06F 9/5044* (2013.01); *G06F 9/5022* (2013.01); *G06F 9/5016* (2013.01); *G06F 9/505* (2013.01); *G06F 9/45558* (2013.01); *G06F 9/5055* (2013.01)

(58) Field of Classification Search
  CPC . G06F 9/45558; G06F 9/5016; G06F 9/5022; G06F 9/5044; G06F 9/505
  USPC ................ 709/224, 225, 226; 718/1
  See application file for complete search history.

(56) References Cited

U.S. PATENT DOCUMENTS

| 5,553,215 | A | 9/1996 | Kaethler ................. 715/219 |
| 5,835,910 | A | 11/1998 | Kavanagh et al. |
| 5,857,211 | A | 1/1999 | Carper et al. |
| 5,913,032 | A | 6/1999 | Schwartz et al. ............ 709/213 |
| 5,983,268 | A | 11/1999 | Freivald et al. |
| 6,157,934 | A | 12/2000 | Khan et al. |
| 6,212,382 | B1 | 4/2001 | Watson et al. |
| 6,571,283 | B1 | 5/2003 | Smorodinsky ............... 709/220 |
| 6,572,662 | B2 | 6/2003 | Manohar et al. |
| 6,578,054 | B1 | 6/2003 | Hopmann et al. ............ 707/625 |
| 6,613,098 | B1 | 9/2003 | Sorge et al. |

(Continued)

FOREIGN PATENT DOCUMENTS

| CN | 1770121 A | 5/2006 |
| CN | 1908934 A | 2/2007 |

(Continued)

OTHER PUBLICATIONS

U.S. Appl. No. 12/908,639, filed Oct. 20, 2010 entitled "Dynamically Splitting Multi-Tenant Databases".

(Continued)

*Primary Examiner* — Hieu Hoang
(74) *Attorney, Agent, or Firm* — Thomas Wong; Jim Ross; Micky Minhas

(57) ABSTRACT

Objects are placed on hosts using hard constraints and soft constraints. The objects to be placed on the host may be many different types of objects. For example, the objects to place may include tenants in a database, virtual machines on a physical machine, databases on a virtual machine, tenants in directory forests, tenants in farms, and the like. When determining a host for an object, a pool of hosts is filtered through a series of hard constraints. The remaining pool of hosts is further filtered through soft constraints to help in selection of a host. A host is then chosen from the remaining hosts.

20 Claims, 7 Drawing Sheets

(56) References Cited

U.S. PATENT DOCUMENTS

| | | | |
|---|---|---|---|
| 6,654,746 B1 | 11/2003 | Wong et al. | |
| 6,675,226 B1 | 1/2004 | Nair et al. | |
| 6,711,593 B1 | 3/2004 | Gordon et al. | 707/615 |
| 6,738,799 B2 | 5/2004 | Dickenson | |
| 6,823,384 B1 | 11/2004 | Wilson et al. | |
| 6,898,727 B1 | 5/2005 | Wang et al. | |
| 6,912,690 B2 | 6/2005 | Bauchot | |
| 6,934,848 B1 | 8/2005 | King et al. | |
| 6,983,311 B1 | 1/2006 | Haitsuka et al. | |
| 6,988,241 B1 | 1/2006 | Guttman et al. | |
| 7,000,228 B2 | 2/2006 | Mortazavi | 717/168 |
| 7,035,926 B1 | 4/2006 | Cohen et al. | |
| 7,047,484 B1 | 5/2006 | Becker et al. | |
| 7,200,804 B1 | 4/2007 | Khavari et al. | |
| 7,325,156 B1 | 1/2008 | Schloss et al. | |
| 7,360,208 B2 | 4/2008 | Joshi et al. | 717/168 |
| 7,363,382 B1* | 4/2008 | Bakke et al. | 709/230 |
| 7,454,471 B2 | 11/2008 | Sorge et al. | |
| 7,454,659 B1 | 11/2008 | Gaudette et al. | |
| 7,463,648 B1 | 12/2008 | Eppstein et al. | |
| 7,480,773 B1* | 1/2009 | Reed | 711/153 |
| 7,516,367 B1 | 4/2009 | Beltowski et al. | |
| 7,555,751 B1 | 6/2009 | Abbavaram et al. | 717/168 |
| 7,577,661 B2 | 8/2009 | Bankston et al. | 1/1 |
| 7,668,961 B2 | 2/2010 | Lomet | 709/230 |
| 7,680,848 B2 | 3/2010 | Janedittakarn et al. | |
| 7,680,933 B2 | 3/2010 | Fatula, Jr. | 709/226 |
| 7,720,820 B2 | 5/2010 | Lomet | 707/682 |
| 7,823,145 B1 | 10/2010 | Le et al. | |
| 7,840,911 B2 | 11/2010 | Milener et al. | |
| 8,103,906 B1* | 1/2012 | Alibakhsh et al. | 714/13 |
| 8,108,779 B1 | 1/2012 | Rein et al. | |
| 8,185,897 B2 | 5/2012 | Kushwaha | |
| 8,250,170 B2 | 8/2012 | Stuckman et al. | |
| 8,296,267 B2 | 10/2012 | Cahill et al. | |
| 8,386,501 B2 | 2/2013 | Cahill et al. | |
| 8,417,737 B2 | 4/2013 | Hopmann et al. | |
| 8,799,453 B2 | 8/2014 | Cahill et al. | |
| 8,850,550 B2 | 9/2014 | Dalzell et al. | |
| 2001/0056554 A1 | 12/2001 | Chrabaszcz | 714/13 |
| 2002/0010746 A1 | 1/2002 | Jilk, Jr. et al. | |
| 2002/0078074 A1 | 6/2002 | Cho et al. | |
| 2002/0078233 A1 | 6/2002 | Biliris et al. | |
| 2002/0129054 A1 | 9/2002 | Ferguson et al. | |
| 2002/0161814 A1 | 10/2002 | Wical | |
| 2002/0162049 A1 | 10/2002 | Takamoto et al. | |
| 2002/0169799 A1 | 11/2002 | Voshell | |
| 2003/0005133 A1 | 1/2003 | Banerjee et al. | |
| 2003/0061365 A1 | 3/2003 | White et al. | 709/229 |
| 2003/0126229 A1 | 7/2003 | Kantor et al. | |
| 2003/0193558 A1 | 10/2003 | Doss et al. | |
| 2003/0204460 A1 | 10/2003 | Robinson et al. | |
| 2003/0221190 A1 | 11/2003 | Deshpande et al. | |
| 2004/0133619 A1 | 7/2004 | Zelig et al. | 709/200 |
| 2004/0143662 A1 | 7/2004 | Poyhonen et al. | |
| 2004/0205765 A1 | 10/2004 | Beringer et al. | |
| 2004/0210623 A1 | 10/2004 | Hydrie et al. | 709/223 |
| 2004/0237045 A1 | 11/2004 | Meltzer | |
| 2005/0050076 A1 | 3/2005 | Tong et al. | |
| 2005/0132382 A1 | 6/2005 | McGuire et al. | |
| 2006/0015806 A1 | 1/2006 | Wallace | |
| 2006/0015932 A1 | 1/2006 | Ballinger et al. | 726/9 |
| 2006/0031268 A1 | 2/2006 | Shutt et al. | |
| 2006/0070020 A1 | 3/2006 | Puttaswamy et al. | |
| 2006/0075076 A1 | 4/2006 | Sinha | |
| 2006/0085785 A1 | 4/2006 | Garrett | 718/1 |
| 2006/0123119 A1 | 6/2006 | Hill et al. | 709/227 |
| 2006/0168218 A1 | 7/2006 | Kashyap | 709/225 |
| 2006/0190698 A1 | 8/2006 | Mizuno et al. | 711/170 |
| 2006/0271395 A1 | 11/2006 | Harris et al. | 718/1 |
| 2006/0277224 A1 | 12/2006 | Aftab et al. | |
| 2007/0005769 A1 | 1/2007 | Ammerlaan et al. | 709/226 |
| 2007/0043860 A1* | 2/2007 | Pabari | 709/224 |
| 2007/0050415 A1 | 3/2007 | Armangau et al. | |
| 2007/0086476 A1 | 4/2007 | Iglesias et al. | |
| 2007/0130566 A1 | 6/2007 | van Rietschote et al. | 718/1 |
| 2007/0169189 A1 | 7/2007 | Crespo et al. | |
| 2007/0198554 A1 | 8/2007 | Liu | 1/1 |
| 2007/0204325 A1 | 8/2007 | Cameron et al. | |
| 2007/0214455 A1 | 9/2007 | Williams et al. | |
| 2007/0219956 A1 | 9/2007 | Milton | 1/1 |
| 2007/0220415 A1 | 9/2007 | Cheng et al. | |
| 2007/0240161 A1 | 10/2007 | Prabhakar et al. | |
| 2007/0245235 A1 | 10/2007 | Singh et al. | |
| 2007/0260644 A1 | 11/2007 | Ljungqvist et al. | |
| 2007/0261049 A1 | 11/2007 | Bankston et al. | |
| 2007/0271560 A1 | 11/2007 | Wahlert et al. | |
| 2007/0285501 A1 | 12/2007 | Yim | |
| 2008/0065674 A1 | 3/2008 | Liu et al. | |
| 2008/0077632 A1 | 3/2008 | Tysowski et al. | |
| 2008/0082560 A1 | 4/2008 | Agrawal et al. | |
| 2008/0098046 A1 | 4/2008 | Alpern et al. | 1/1 |
| 2008/0120351 A1 | 5/2008 | Khaladkar et al. | |
| 2008/0126428 A1 | 5/2008 | Swanburg | |
| 2008/0147753 A1 | 6/2008 | Chasman et al. | |
| 2008/0154915 A1 | 6/2008 | Flake et al. | |
| 2008/0155023 A1 | 6/2008 | Kadashevich | |
| 2008/0189468 A1 | 8/2008 | Schmidt et al. | 711/6 |
| 2008/0189700 A1* | 8/2008 | Schmidt et al. | 718/1 |
| 2008/0243867 A1 | 10/2008 | Janedittakarn et al. | 1/1 |
| 2008/0244184 A1 | 10/2008 | Lewis et al. | 711/130 |
| 2008/0256607 A1 | 10/2008 | Janedittakarn et al. | |
| 2008/0270459 A1 | 10/2008 | Grewal et al. | |
| 2008/0270564 A1 | 10/2008 | Rangegowda et al. | 709/212 |
| 2008/0289020 A1 | 11/2008 | Cameron et al. | |
| 2009/0018999 A1 | 1/2009 | Petri | |
| 2009/0083561 A1 | 3/2009 | Kaburlasos et al. | |
| 2009/0100419 A1 | 4/2009 | Childress et al. | |
| 2009/0113442 A1 | 4/2009 | Deidda et al. | |
| 2009/0164621 A1 | 6/2009 | Kothari et al. | 709/224 |
| 2009/0199177 A1 | 8/2009 | Edwards et al. | |
| 2009/0216789 A1 | 8/2009 | Chowdhary et al. | |
| 2009/0216855 A1 | 8/2009 | Lang et al. | |
| 2009/0216975 A1 | 8/2009 | Halperin et al. | |
| 2009/0228589 A1* | 9/2009 | Korupolu | 709/226 |
| 2009/0228950 A1 | 9/2009 | Reed et al. | 726/1 |
| 2009/0248756 A1 | 10/2009 | Akidau et al. | |
| 2009/0293022 A1 | 11/2009 | Fries | 716/132 |
| 2009/0293056 A1 | 11/2009 | Ferris | |
| 2009/0327139 A1 | 12/2009 | Shah et al. | 705/71 |
| 2010/0011315 A1 | 1/2010 | Araki | |
| 2010/0011409 A1 | 1/2010 | Hodgkinson et al. | 726/1 |
| 2010/0027552 A1* | 2/2010 | Hill | 370/401 |
| 2010/0058349 A1 | 3/2010 | Diwakar et al. | |
| 2010/0070466 A1 | 3/2010 | Prahlad et al. | |
| 2010/0082860 A1 | 4/2010 | Murthy | |
| 2010/0083253 A1 | 4/2010 | Kushwaha | |
| 2010/0095198 A1 | 4/2010 | Bultrowicz et al. | |
| 2010/0106812 A1 | 4/2010 | Bernabeu-Auban et al. | 709/221 |
| 2010/0121902 A1 | 5/2010 | Chandrasekhar et al. | |
| 2010/0125612 A1 | 5/2010 | Amradkar et al. | 707/802 |
| 2010/0145861 A1 | 6/2010 | Law et al. | |
| 2010/0146290 A1 | 6/2010 | Bachmann et al. | 713/185 |
| 2010/0162226 A1 | 6/2010 | Borissov et al. | 717/173 |
| 2010/0192143 A1 | 7/2010 | Ingle et al. | 717/172 |
| 2010/0205227 A1 | 8/2010 | Weissman et al. | |
| 2010/0211548 A1 | 8/2010 | Ott et al. | |
| 2010/0211619 A1 | 8/2010 | Weissman et al. | |
| 2010/0251242 A1 | 9/2010 | Sivasubramanian et al. | |
| 2010/0251339 A1 | 9/2010 | Mcalister | |
| 2010/0262632 A1 | 10/2010 | Jain et al. | |
| 2010/0275222 A1 | 10/2010 | Wallace | |
| 2010/0287359 A1 | 11/2010 | Norden | |
| 2010/0312810 A1 | 12/2010 | Horton et al. | |
| 2011/0072486 A1* | 3/2011 | Hadar et al. | 726/1 |
| 2011/0078113 A1 | 3/2011 | Franz | |
| 2011/0138391 A1* | 6/2011 | Cho et al. | 718/102 |
| 2011/0161964 A1 | 6/2011 | Piazza et al. | |
| 2011/0173303 A1* | 7/2011 | Rider | 709/220 |
| 2012/0101983 A1 | 4/2012 | Hopmann et al. | |
| 2012/0101998 A1 | 4/2012 | Cahill et al. | |
| 2012/0102067 A1 | 4/2012 | Cahill et al. | |
| 2012/0102198 A1 | 4/2012 | Cahill et al. | |
| 2012/0102480 A1 | 4/2012 | Hopmann et al. | |

(56) References Cited

U.S. PATENT DOCUMENTS

| | | |
|---|---|---|
| 2012/0102494 A1 | 4/2012 | Cahill et al. |
| 2012/0102506 A1 | 4/2012 | Hopmann et al. |
| 2012/0131660 A1 | 5/2012 | Dalzell et al. |
| 2012/0151378 A1 | 6/2012 | Parish et al. |
| 2013/0159344 A1 | 6/2013 | Cahill et al. |
| 2013/0226973 A1 | 8/2013 | Hopmann et al. |
| 2014/0033009 A1 | 1/2014 | Rein et al. |
| 2014/0337502 A1 | 11/2014 | Cahill et al. |

FOREIGN PATENT DOCUMENTS

| | | |
|---|---|---|
| CN | 1989489 | 6/2007 |
| CN | 101162988 A | 4/2008 |
| CN | 101410774 | 4/2009 |
| CN | 101657804 | 2/2010 |
| CN | 20111033894.3 | 6/2014 |
| KR | 10-0980599 | 9/2010 |
| SG | 189412 | 6/2014 |
| SG | 189417 | 6/2014 |
| WO | 2010-090899 | 8/2010 |

OTHER PUBLICATIONS

U.S. Appl. No. 12/908,623, filed Oct. 20, 2010 entitled "High Availability of Machines During Patching".

U.S. Appl. No. 12/908,653, filed Oct. 20, 2010 entitled "Web Service Patterns for Globally Distributed Service Fabric".

U.S. Appl. No. 12/908,590, filed Oct. 20, 2010 entitled "Machine Manager Service Fabric".

U.S. Appl. No. 12/908,703, filed Oct. 20, 2010 entitled "Online Database Availability During Upgrade".

U.S. Appl. No. 12/908,752, filed Oct. 20, 2010 entitled "Upgrade of Highly Available Farm Server Groups".

U.S. Appl. No. 12/908,694, filed Oct. 20, 2010 entitled "Managing Networks and Machines for an Online Service".

U.S. Appl. No. 12/953,379, filed Nov. 23, 2010 entitled "Using Cached Security Tokens in an Online Service".

U.S. Appl. No. 12/964,633, filed Dec. 9, 2010 entitled "Codeless Sharing of Spreadsheet Objects".

Above the Cloud; "The Azure Fabric Controller"; Published Mar. 23, 2009; http://azure.snagy.name/blog/?p=89; 3 pgs.

"Adopting Server Virtualization for Business Continuity and Disaster Recovery"; CA ARCserve Backup and CA Xosoft Replication and High Availability Software with Hyper-V Technology—A Powerful Combination; Published 2009; 17 pgs.

Allamaraju; "Idempotency Explained"; Published Feb. 21, 2008; 5 pgs.

"BadBlue Excel Web Spreadsheet Collaboration Server 2.72b"; Published Apr. 20, 2010; http://badblue-excel-web-spreadsheet-collaboration-server.badblue.qarchive.org/; 2 pgs.

Chaisiri et al., "Optimal Virtual Machine Pacement across Multiple Cloud Providers"; School of Computer Engineering, Nanyang Technological University, Singapore; 2009 IEEE; 8 pgs.

Chronic db; "Live Database Schema Updates—Zero Downtime"; Retrieved Sep. 20, 2010; http://chronicdb.com/benefits_of_chronicdb; 3 pgs.

Crets; "Idempotent Services"; Blog of Guy Crets; Jul. 9, 2008; 1 pg.

Das et ak., "ElasTraS: An Elastic: An Elastic, Scalable, and Self Managing Transactional Database for the Cloud"; Department of Computer Science, University of California, Santa Barbara, CA; UCSB Computer Science Technical Report Apr. 2010; 14 pgs.

"Excel Services Overview (SharePoint Server 2010)"; Microsoft Corporation; Published May 12, 2010; http://technet.microsoft.com/en-us/library/ee424405.aspx; 3 pgs.

Exortech; "Zero-Downtime Database Deployment"; Published Feb. 1, 2009; http://exortech.com/blog/2009/02/01weekly-release-blog-11-zero-downtime-database-deployment; 3 pgs.

Forster et al.; "Using SAML Security Tokens with Microsoft Web Services Enhancements"; Published Apr. 29, 2008; http://www.ibm.com/ developerworks/tivoli/library/t-samlwse/index.html; 23 pgs.

"HP Serviceguard Cluster Configuration for HP-UX 11i or Linux Partitioned Systems"; Apr. 2009; 13 pgs.

Hyser et al., "Autonomic Virtual Machine Placement in the Data Center"; HP Laboratories; Feb. 26, 2008; 11 pgs.

"IBM Director v6.2.x"; Retrieved Sep. 20, 2010; http://publib.boulder.ibm.com/infocenter/director/v6r2x/index.jsp?topic=/com.ibm.director.updates.helps.doc/fqm0_t_um_updating_systems.html; 2 pgs.

KaChing Engineering; "No Downtime Database Schema Changes"; Published Aug. 15, 2010; http://eng.kaching.com/2010/08/no-downtime-database-schema-changes.html; 4 pgs.

Kim, "Virtual Machine Placement Optimization"; Carnegie Mellon Engineering, Carnegie Institute of Technology; Retrieved Date—Aug. 26, 2010; 2 pgs.

Kumar; "Sharing and Previewing Google Docs in Socialwok: Google Data SPI"; Published Apr. 9, 2010; http://googleappsdeveloper.blogspot.com/2010/04/ sharing-and-previewing-google-docs-in.html; 6 pgs.

"LinkedCells 1.8 Description"; WareSeeker.com; Published Mar. 16, 2009; http://wareseeker.com/Business-Finance/linkedcells-1.8.zip/1f2ea4b9e; 3 pgs.

Meng et al., "Improving the Scalability of Data Center Networks with Traffic-aware Virtual Machine Placement"; IBM T.J. Watson Research Center; 9 pgs.

"Microsoft High Availability Overview White Paper"; Published Jan. 2008; 19 pgs.

Microsoft; "Virtual Machine Manager"; Retrieved Sep. 21, 2010; http://www.microsoft.com/systemcenter/en/us/virtual-machine-manager.aspx; 2 pgs.

Microsoft Corporation; "Scaling Out SQL Server 2005"; Published Date: Apr. 2006; http://msdn.microsoft.com/en-us/library/aa479364.aspx; 15 pgs.

Microsoft Corporation; "Messaging Patterns in Service-Oriented Architecture, Part 1"; Published Apr. 2004; 10 pgs.

Microsoft TechNet; "Placing Virtual Machines on Hosts"; 2010 Microsoft Corporation; 3 pgs.

Microsoft TechNet; "Configure a Server Farm for Minimal Downtime During Software Updates (Office SharePoint Server 2007)"; Published Sep. 17, 2009; http://technet.microsoft.com/en-us/library/ee514459(office.12).aspx; 26 pgs.

Microsoft TechNet; "Configure Claims-Based Authentication Using Windows Live ID (SharePoint Server 2010)"; Published Sep. 9, 2010; http://technet.microsoft.com/en-us/library/ff973117(printer).aspx; 117 pgs.

MSDN Magazine; "Designing Services for Windows Azure"; Published Jan. 2010; 11 pgs.

"MySQL Cluster Features"; Retrieved Sep. 20, 2010; http://www.mysql.com/products/database/cluster/features.html; 5 pgs.

"The NorduGrid Grid Manager and GridFTP Server"; Published Aug. 10, 2010; http://www.nordugrid.org/documents/GM-pdf; 37 pgs.

Oracle9i Database Migration; "Compatibility and Interoperability"; Retrieved Sep. 20, 2010; http://download.oracle.com/docs/cd/A97630_01/server.920/a96530/migcompa.htm; 42 pgs.

Ranganathan; "Idempotency in Services"; Published Dec. 1, 2009; 21 pgs.

"RightGrid Basic Example"; Retrieved Sep. 24, 2010; http://support.rightscale.com/03-Tutorials/02-AWS/03-Grid_Edition/Basic_RightGrid_Example; 16 pgs.

"SAS Grid Computing"; SAS Institute; Retrieved Sep. 24, 2010; http://www.sas.com/technologies/architecture/grid/index.html; 2 pgs.

"Small to Medium Sized Data Center with Applogic Cloud"; Migrate to Cloud; Published Jul. 22, 2010; http://www.migrate2cloud.com/blog/small-to-medium-sized-date-center-with-applogic-cloud; 4 pgs.

Tarighi et al., "A New Model for Virtual Machine Migration in Virtualized Cluster Server Based on Fuzzy Decision Making"; Journal of Telecommunications, vol. 1, Issue 1, Feb. 2010; 12 pgs.

"Understanding SharePoint 2010 Claims Authentication"; Published May 27, 2010; http://blogs.msdn.com/b/russmax/archive/2010/05/27/ understanding-sharepoint-2010-claimsauthentication.aspx; 5 pgs.

(56) References Cited

OTHER PUBLICATIONS

"Using Vmware vCenter Update Manager to Keep your vSphere Hosts Up-to-Date with Patching"; Published Feb. 9, 2010; http://www.simple-talk.com/sysadmin/virtualization/using-vmware-vcenter-update-manager-to-keep-your-vsphere-hosts-up-to-date-with-patching/; 10 pgs.
Vmware; "Automating High Availability (HA) Services with Vmware HA"; Copyright 1998-2006; 15 pgs.
Vmware vSphere; "Vmware vCenter Update Manager"; Retrieved Sep. 14, 2010; 2 pgs.
"Vmware Virtual Appliances"; Published Jan. 8, 2009; http://www.petri.co.il/virtual_vmware_virtual_appliances.htm; 2 pgs.
Wang et al., "A Study and Performance Evaluation of the Multi-Tenant Data Tier Design Patterns for Service Oriented Computing"; IBM China Research Lab, Beijing, China; IEEE Computer Society, 2008 IEEE; 8 pgs.
"XLCubed Web Edition"; Published 2009; http://xlcubed.com/en/web.html; 2 pgs.
"Zones Parallel Patching Feature Now Available"; Pbulished Date Jun. 17, 2009; 1 pg.
U.S. Office Action dated Nov. 6, 2012 cited in U.S. Appl. No. 12/908,694.
U.S. Office Action dated Nov. 30, 2012 cited in U.S. Appl. No. 12/908,653.
U.S. Office Action dated Dec. 5, 2012 cited in U.S. Appl. No. 12/953,379.
International Search Report dated Apr. 25, 2012 cited in Appln No. PCT/US2011/054516.
International Search Report dated May 1, 2012 cited in Appln No. PCT/US2011/052175.
International Search Report dated May 3, 2012 cited in Appln No. PCT/US2011/053370.
International Search Report dated May 4, 2012 cited in Appln No. PCT/US2011/056594.
International Search Report dated May 17, 2012 cited in Appln No. PCT/US2011/054642.
International Search Report dated Jun. 15, 2012 cited in Appln No. PCT/US2011/062170.
Meng et al., "Improving the Scalability of Data Center Networks with Traffic-aware Virtual Machine Placement"; IBM T.J. Watson Research Center; Published May 6, 2010; 9 pgs.
International Search Report dated Mar. 6, 2012 cited in Appln No. PCT/US2011/054566.
International Search Report dated Mar. 6, 2012 cited in Appln No. PCT/US2011/055412.
International Search Report dated Mar. 26, 2012 cited in Appln No. PCT/US2011/053296.
U.S. Office Action dated Apr. 16, 2012 cited in U.S. Appl. No. 12/908,639.
U.S. Office Action dated Apr. 27, 2012 cited in U.S. Appl. No. 12/908,703.
U.S. Appl. No. 13/858,630, filed Apr. 8, 2013 entitled "Online Database Availability During Upgrade".
U.S. Appl. No. 13/657,561, filed Oct. 22, 2012 entitled "Upgrade of Highly Available Farm Server Groups".
Google et al., "Google Docs & Spreadsheet Tour", Feb. 2007, pp. 1-14.
U.S. Office Action dated Mar. 20, 2013 cited in U.S. Appl. No. 12/908,590.
U.S. Office Action dated Mar. 27, 2013 cited in U.S. Appl. No. 12/908,623.
U.S. Office Action dated Mar. 28, 2013 cited in U.S. Appl. No. 12/964,633.
U.S. Office Action dated May 14, 2013 cited in U.S. Appl. No. 12/908,694.
Google et. al. "What is the correct syntax for import range function for the key attribute?"; http://productforums.google.com/forum/=!topic/docs/aqJAApdcr88; published Jan. 18, 2009; 3 pgs.
Stackexchange.com et. al., "How do I link a cell in Google Spreadsheets to a cell in another document?" See Google Spreadsheets function list "ImportRange".
Chinese Office Action dated Nov. 22, 2013 cited in Appln No. 201110339894.3.
Chinese Office Action dated Dec. 17, 2013 cited in Appln No. 201110430658.2.
Chinese Office Action dated Dec. 19, 2013 cited in Appln No. 201110339912.8.
Chinese Office Action dated Dec. 30, 2013 cited in Appln No, 201110339964.5.
Chinese Office Action dated Jan. 16, 2014 cited in Appln No. 201110339862.3.
U.S. Office Action dated Nov. 7, 2013 cited in U.S. Appl. No. 12/964,633.
Chinese Office Action dated Aug. 28, 2013 cited in Appln No. 201110340491.0.
Chinese Office Action dated Oct. 14, 2013 cited in Appln No. 201110339864.2.
Chinese Office Action dated Oct. 31, 2013 cited in Appln No. 201110340455.4.
U.S. Office Action dated Sep. 16, 2013 cited in U.S. Appl. No. 12/908,653.
U.S. Office Action dated Sep. 19, 2013 cited in U.S. Appl. No. 12/953,379.
U.S. Office Action dated Oct. 22, 2013 cited in U.S. Appl. No. 12/908,623.
Chinese Notice on Grant dated Feb. 10, 2014 cited in 201110339894.3, 4 pgs.
Chinese Second Office Action dated Mar. 27, 2014 cited in Appln No. 201110340491.0, 6 pgs.
Chinese Notice on Grant dated May 26, 2014 cited in 20111033912.8, 3 pgs.
Chinese Second Office Action dated May 26, 2014 cited in Appln No, 201110339964.5, 6 pgs.
Chinese Second Office Action dated Jun. 3, 2014 cited in Appln No. 201110339864.2, 11 pgs.
Chinese Second Office Action dated Jun. 11, 2014 cited in Appln No. 201110340455.4, 6 pgs.
Chinese Third Office Action dated Jun. 25, 2014 cited in Appln No. 201110340491.0, 12 pgs.
Chinese Notice on Grant dated Jul. 3, 2014 cited in 201110340105.8, 4 pgs.
Chinese Second Office Action dated Jul. 11, 2014 cited in 201110430658.2, 10 pgs.
U.S. Office Action dated Jun. 5, 2013 cited in U.S. Appl. No. 12/953,379.
U.S. Appl. No. 14/445,572, filed Jul. 29, 2014 entitled "Managing Networks and Machines for an Online Service".
U.S. Office Action dated Aug. 4, 2014 cited in U.S. Appl. No. 13/768,727, 49 pgs.
U.S. Office Action dated Sep. 10, 2014 cited in U.S. Appl. No. 12/908,623, 26 pgs.
U.S. Office Action dated Sep. 19, 2014 cited in U.S. Appl. No. 12/964,633, 24 pgs.
U.S. Office Action dated Sep. 24, 2014 cited in U.S. Appl. No. 13/858,630, 63 pgs.
Chinese Notice of Allowance dated May 26, 2014 cited in Appln No. 201110339912.8, 4 pgs.
Chinese Third Office Action dated Sep. 15, 2014 cited in Appln No. 201110340455.4, 6 pgs.
Chinese Second Office Action dated Sep. 18, 2014 cited in Appln No. 201110339862.3, 17 pgs.
EP Extended Search Report dated Nov. 14, 2014 cited in Appln No. PCT/US2011/056594, 7 pgs.
EP Supplementary Search Report dated Dec. 2, 2014 cited in Appln No. PCT/US2011/056594, 1 pg.
Chinese Third Office Action mailed Dec. 12, 2014 in Application No. 201110339864.2, 11 pgs.
Chinese Third Office Action Issued in Patent Application No. 201110339964.5, Mailed Date: Dec. 12, 2014, 8 pgs.

(56) References Cited

OTHER PUBLICATIONS

Chinese Fourth Office Action dated Dec. 25, 2014 cited in Application No. 201110340491.0, 9 pgs.
Chinese Third Office Action dated Jan. 14, 2015 cited in Application No. 201110430658.2, 10 pgs.
U.S. Office Action dated Jan. 15, 2015 cited in U.S. Appl. No. 12/964,633, 20 pgs.
Chinese Third Office Action Issued in Patent Application No. 201110339862.3, Mailed Date: Apr. 7, 2015, 6 Pgs. (Ms# 331059. 031 14917.1627CC01).

* cited by examiner

PLACING OBJECTS ON HOSTS USING HARD AND SOFT CONSTRAINTS

BACKGROUND

Web-based services include files that are located on web servers along with data that is stored in databases. For example, there are a large number of servers located within different networks to handle the traffic that is directed to the service. Managing and deploying the large number of servers is a time consuming process that requires a large operations staff that is subject to human error.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Objects are placed on hosts using hard constraints and soft constraints. The objects to be placed on the host may be many different types of objects. For example, the objects to place may include tenants in a database, virtual machines on a physical machine, databases on a virtual machine, tenants in directory forests, tenants in farms, and the like. When determining a host for an object, a pool of hosts is filtered through a series of hard constraints. The remaining pool of hosts is further filtered through soft constraints to help in selection of a host. A host is then chosen from the remaining hosts.

DETAILED DESCRIPTION

Figure 1:
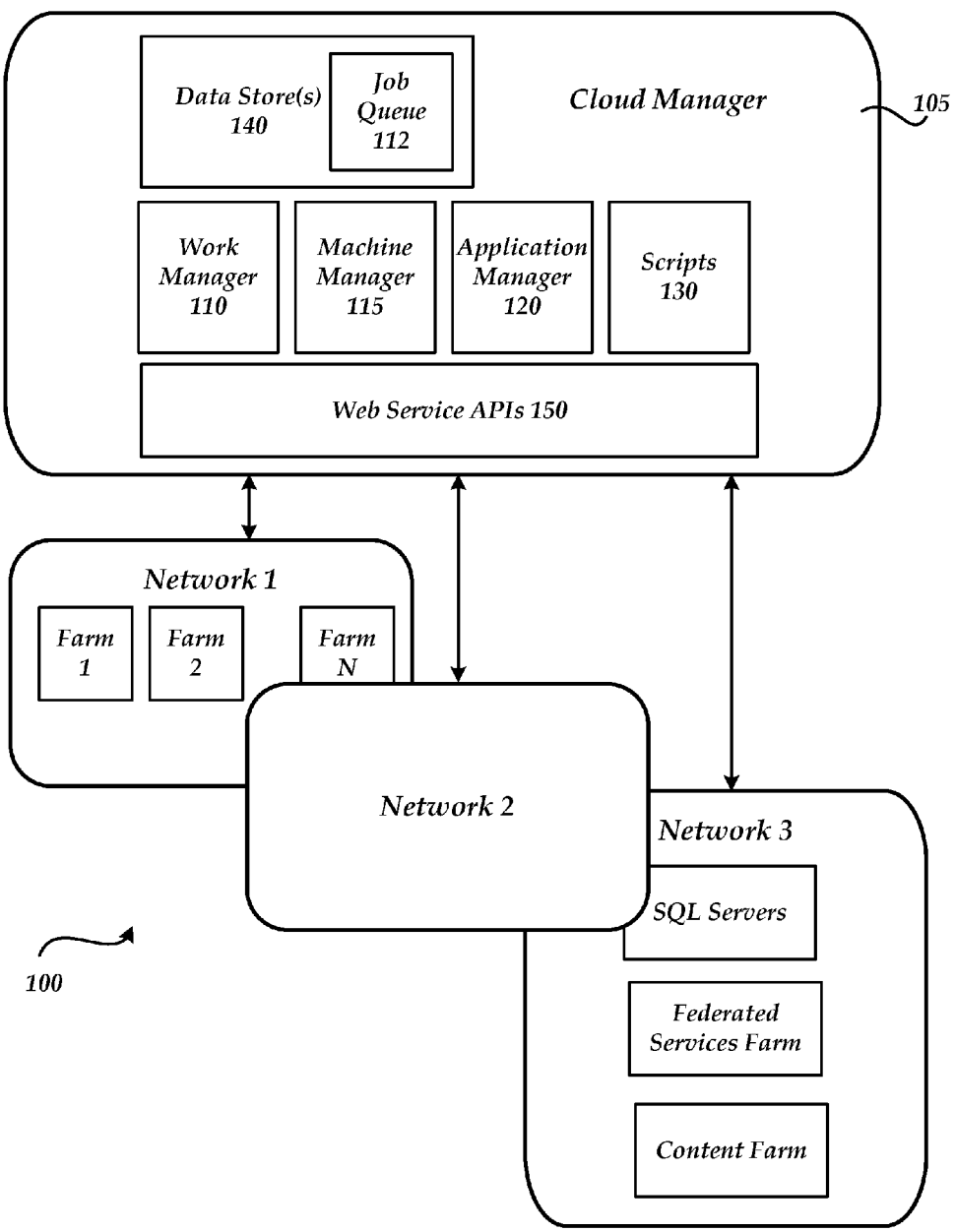
FIG. 1 illustrates a cloud manager system for managing networks that are associated with an online service, such as a content management service.

Referring now to the drawings, in which like numerals represent like elements, various embodiment will be described.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

FIG. 1 illustrates a cloud management system for managing networks that are associated with an online service. System 100 illustrates cloud manager 105 that is connected to and manages different networks potentially distributed across the world. Each of the networks is configured to provide content services for one or more tenants (e.g. clients, customers). The networks may be hosted within a cloud service and/or in an on-premises data center. Cloud manager 105 is used in deploying, configuring and managing the networks. The cloud manager is configured to receive requests through an idempotent and asynchronous application web service application programming interface (API) 150 that can tolerate intermittent network failures.

As illustrated, cloud manager 105 comprises work manager 110, machine manager 115, application specific manager 120, scripts 130 and a central repository, such as data store(s) 140 (e.g. databases). The functionality that is not included within one of the illustrated managers may reside in some other location of the cloud manager. According to one embodiment, application manager 120 is a SharePoint tenant manager that comprises SharePoint specific logic.

Work manager 110 manages the execution of tasks and enables scheduling and retry of longer running tasks. Work manager 110 starts jobs stored in job queue 112 and keeps track of running jobs. When a predetermined time has elapsed, work manager 110 may automatically cancel the task and perform some further processing relating to the task. According to one embodiment, the tasks in job queue 112 are executed by work manager 110 by invoking one or more scripts 130. For example, a scripting language such as Microsoft's PowerShell® may be used to program the tasks that are executed by work manager 110. Each script may be run as a new process. While executing each script as a new process may have a fairly high CPU overhead, this system is scalable and helps to ensure a clean environment for each script execution plus full cleanup when the script is completed.

Machine manager 115 is configured to manage the physical machines in the networks (e.g. Network 1, Network 2, Network 3). Generally, machine manager 115 understands Networks, Physical Machines, Virtual Machines (VMs), VM Images (VHDs), and the like. The machine manager does not have a strong binding to the specific services running within the networks but keeps track of the various components in the networks in terms of "roles." For example machine manager 115 could be requested through API 150 to deploy a VM of type "Foo" with version 12.34.56.78 on Network 3. In response to a request to cloud manager 105, machine manager 115 locates a suitable Physical Machine that is located on Network 3 and configures the VM according to the VM Image associated with the VM's Role. The physical machine is configured with a VHD of type Foo with version 12.34.56.78 that is stored within a data store, such as data store 140. The images used within the network may also be stored in other locations, such as a local data share for one or more of the networks. Scripts may be run to perform the installation of the VHD on the physical machine as well as for performing any post-deployment configuration. Machine manager 115 keeps track of the configuration of the machines each network. For example, machine manager 115 may keep track of a VM's role (type of VM), state of the VM (Provisioning, Running, Stopped, Failed), version and whether the VM exists in a given farm (which implies their network).

Scripts 130 is configured to store scripts that are executed to perform work both locally for cloud manager 105 and remotely on one or more of the networks. One or more of the scripts 130 may also be stored in other locations. For example, scripts to be performed on a network (e.g. Network 1, Network 2, Network 3) may be stored locally to that network. The scripts may be used for many different purposes. For example, the scripts may be used to perform configurations of machines in one or more of the networks, changing settings on previously configured machines, add a new VM, add a new database, move data from one machine to another, move tenants, change schemas, and the like. According to one embodiment, the scripts are Microsoft's PowerShell® scripts. Other programming implementations may be used. For example, a compiled and/or early-bound programming language may be used to implement the functionality. Scripting, however, is a fairly concise language to express many of the tasks that are to be performed. Programming the equivalent in a programming language, such as C#, would often require much more verbose implementations. The scripts are also late-bound, meaning that multiple versions of underlying code-bases can be targeted without having to constantly link to different interface DLLs. Using PowerShell scripts allows a process to be started locally by cloud manager 105 that may in turn start a process on a remote machine (i.e. a physical machine in one of the attached networks). Other techniques may also be used to start a process on a remote machine, such as Secure Shell (SSH) and the like.

Application specific information that cloud manager 105 is managing is performed by application manager 120. According to one embodiment, the application specific information relates to Microsoft SharePoint®. As such, application manager 120 is configured to know about SharePoint Tenants, Site Collections, and the like.

Each network may be configured as a dedicated network for a tenant and/or as a multi-tenant network that services more than one client. The networks may include a changing number of physical/virtual machines with their configuration also changing after deployment. Generally, a network may continue to grow as long as the networking limits (e.g. load balancer and network switches) are not exceeded. For example, a network may start out with ten servers and later expand to one hundred or more servers. The physical machines within a network may be assigned a class or type. For example, some of the machines may be compute machines (used for web front ends and app servers) and other machines may be storage machines that are provisioned with more storage than compute machines. According to an embodiment, cloud manager 105 configures the machines within a network with multiple versions of the image files. According to an embodiment, farms usually have a same version of image files.

According to one embodiment, the software limits are managed by the cloud manager system 100 within the network by virtualizing the machines and managing independently acting "Farms" inside the network. Each network may include one or more farms (e.g. see Network 1). According to one embodiment, a network is considered a single cluster of network load balanced machines that expose one or more VIP (Virtual IP) to the outside world and can route that traffic to any of the machines within the network. The machines in the network generally are tightly coupled and have minimum latencies (i.e. <1 ms ping latency).

Farms are the basic grouping of machines used to coordinate applications that need tightly bound relationships. For example, content farms may be deployed within each of the networks for a content management application, such as Microsoft SharePoint®. Generally, the set of machines in each of the farms provide web service and application server functions together. Typically, the machines inside the farm are running the same build of an application (i.e. SharePoint) and are sharing a common configuration database to serve specific tenants and site collections.

Farms can contain heterogeneous sets of virtual machines. Cloud manager 105 maintains a "farm goal" within data store 140 which is a target number of machines of each role for each farm. Some roles include Content Front End, Content Central Admin, Content Timer Service, Federated Central Admin, Federated App Server etc. For example, content farms are the basic SharePoint farm that handles incoming customer requests. Federated Services farms contain SharePoint services that can operate cross farms such as search and the profile store. Farms may be used for hosting large capacity public internet sites. Some farms may contain a group of Active Directory servers and a Provisioning Daemon. Cloud manager 105 automatically deploys and/or decommissions virtual machines in the networks to help in meeting the defined target. These farms goals may be automatically and/or manually configured. For example, the farm goals may change to respond to changes in activity and capacity needs. Network Farm—there is one network farm per Network that contains all the VM roles that scale out easily as a resource to the whole Network.

The Cloud Manager Web Service APIs 150 are designed to work in the context of a massively scalable global service. The APIs assume that any network request might fail and/or hang in transit. Calls to cloud manager 105 are configured to be idempotent. In other words, the same call may be made to cloud manager 105 multiple times (as long as the parameters are identical) without changing the outcome.

Cloud manager 105 is designed to do very little processing (<10 ms, <50 ms) before returning a response to any given request. Cloud manager 105 maintains records to keep track of current requests. For example, cloud manager 105 updates records in a local database and if necessary schedules a "job" to perform more lengthy activity later.

Cloud manager keeps track of Images (such as Virtual Disk Images) that are the templates used to deploy new machines within a network. The Image references may be stored in a database, such as database 140, and/or in some other location. The images may be stored in one or more shared data stores that are local to the network(s) on which the image will be deployed. According to one embodiment, each Image includes a virtual machine (VM) role type that specifies the type of VM it can deploy, the number of processors that it should use, the amount of RAM that it will be assigned, a network ID used to find a nearby install point (so they don't get copied repeatedly over the cross data-center links) and a share path that the deployment code can use to access the VHD.

Generally, machines in the networks being managed by cloud system 100 are not upgraded in the traditional manner by downloading data and incorporating the data into the existing software on the machine. Instead, machines are updated by replacing a VHD with an updated VHD. For example, when a new version of software is needed by a farm, a new farm is deployed that has the new version installed. When the new farm is deployed, the tenants are moved from the old farm to the new farm. In this way, downtime due to an upgrade is minimized and each machine in the farm has a same version that have been tested. When a virtual machine needs to be upgraded, the VM on the machine may be deleted and replaced with the VM that is configured to run the desired service.

While upgrades to existing software are not optimal, some servers within the networks do utilize the traditional update procedure of an in-place upgrade. For example, Active Directory Domain Controllers are upgraded by updating the current software on the server without completely replacing an image on the machine. The cloud manager may also be upgraded in place in some instances.

Figure 2:
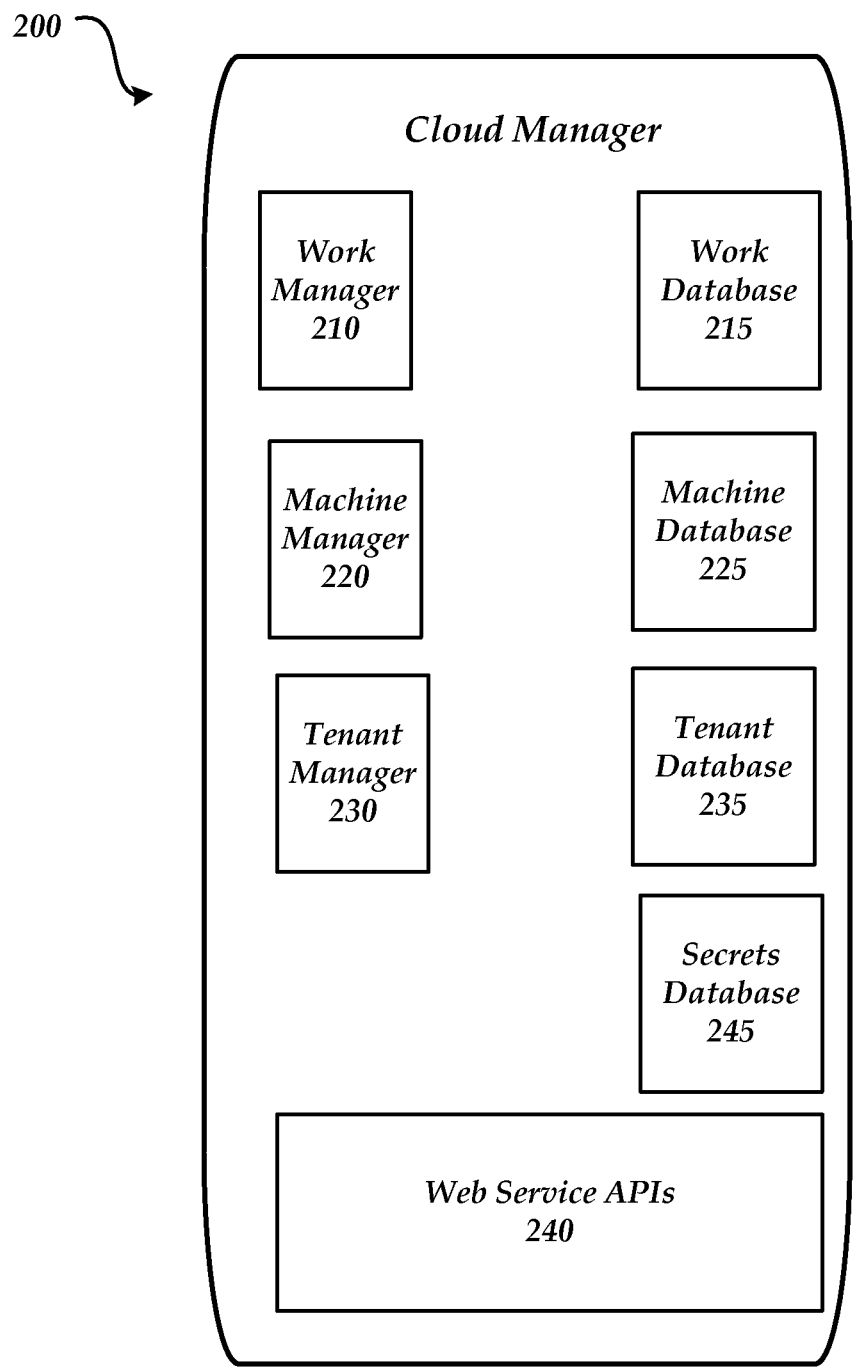
FIG. 2 shows a cloud manager including managers and associated databases.

FIG. 2 shows a cloud manager including managers and associated databases. As illustrated, cloud manager 200 comprises work manager 210, work database 215, machine manager 220, machine database 225, tenant manager 230, tenant database 235, secrets database 245 and web service APIs 240.

Generally, databases used within a cloud management system (e.g. system 100) are sized to enable high performance. For example, a database (such as work database 215, machine database 225, tenant database 235 and secrets database 245) may not exceed a predefined size limit (e.g. 30 GB, 50 GB, 100 GB, and the like). According to an embodiment, a database is sized such that it is small enough to fit in-memory of a physical machine. This assists in high read I/O performance. The size of the database may also be selected based on performance with an application program, such as interactions with a SQL server. The databases used in the farms may also be sized to enable high performance. For example, they may be sized to fit in-memory of the host machine and/or sized such that backup operations, move operations, copy operations, restore operations are generally performed within a predetermined period of time.

Cloud manager 200 divides the cloud manager data into four databases. The work database 215 for the work manager. The machine database 225 for the machine manager 220. The tenant database 235 for the tenant manager 230 and a secrets database 245 for storing sensitive information such as system account and password information, credentials, certificates, and the like. The databases may be on the same server and or split across servers. According to an embodiment, each database is mirrored for high availability and is a SQL database.

Cloud manager 200 is configured to interact with the databases using a reduced set of SQL features in order to assist in providing availability of the cloud manager 200 during upgrades of the databases. For example, foreign keys or stored procedures are attempted to be avoided. Foreign keys can make schema changes difficult and cause unanticipated failure conditions. Stored procedures place more of the application in the database itself.

Communications with the SQL servers are attempted to be minimized since roundtrips can be expensive compared to the cost of the underlying operation. For example, its usually much more efficient if all of the current SQL server interactions to a single database are wrapped in a single round-trip.

Constraints are rarely used within the databases (215, 225, 235). Generally, constraints are useful when it helps provide simple updates with the right kind of error handing without extra queries. For example, the fully qualified domain name (FQDN) table has a constraint placed on the "name" to assist in preventing a tenant from accidentally trying to claim the same FQDN as is already allocated to a different tenant.

Caution is used when adding indices. Indices typically improve read performance at the cost of extra I/Os for write operations. Since the data within the databases is primarily RAM resident, even full table scans are relatively fast. According to an embodiment, indices may be added once the query patterns have stabilized and a performance improvement may be determined by proposed indices. According to an embodiment, if adding the index will potentially take a long time the "ONLINE=ON" option may be specified such that the table isn't locked while the index is initially built.

According to an embodiment, upgrades to databases within the cloud manager may be performed without causing downtime to the cloud manager system. In other words, even during an upgrade of the cloud manager, the cloud manager continues processing received requests. As such, changes made to the schema are to be compatible with the previous schema. The SQL schema upgrade is run before the web servers used by the cloud manager are upgraded. When the web servers are upgraded they can start to use the new features enabled in the database. Database upgrades are limited such that operations involved in the upgrade are quick and efficient. For example, tables may be added and new nullable columns may be added to existing columns. New columns may be added at the end of a table. Generally, time consuming operations to the databases are avoided. For example, adding a default value to a newly added column at creation time may be a very time consuming operation when there is a large amount of data. Adding a nullable column, however, is a very quick operation. As discussed above, adding new indices are allowed, but caution should be taken when adding a new constraint to help ensure sure that the schema upgrade won't break with the existing data. For example, when a constraint is added it may be set to a state that is not checked and avoids a costly validation of existing rows and potential errors. Old tables and unused columns are removed after a new version is being used and the cloud manager is not accessing those tables and columns.

Generally, a single row in each of the databases is used to indicate a task and/or a desired state. For example, the tenant database 235 includes a single row for each tenant. A given tenant may include a Required Version record. This record is used to help ensure that the tenant is placed on a farm running the required version. For example, for tenant 1 to stay on SharePoint 14 SP1, the required version for tenant could be set to "14.1." and any version including 14.1 would match and any other versions (e.g. 14.2.xxxx) would not match. The tenant records may include other items such as authorized number of users, quotas (e.g. allowed total data usage, per user data usage, etc.), time restrictions, and the like. Some organization might have multiple tenants that represent different geographies, organizations or capabilities. According to an embodiment, tenants are walled off from each other without explicit invitation of the users (via extranet or other features).

According to one embodiment, each tenant is locked into a specific network. Tenants are kept localized to a small set of databases. A tenant is either small (smaller than would fill one database) in which case it is in exactly one database, shared with other tenants. This implies that all the tenants sharing that database need to upgrade at the same time. When a tenant grows larger it may be moved to its own dedicated database(s) and now might have more than one, but is not sharing databases with other tenants. Maintaining a large tenant in one or more dedicated databases helps in reducing a number of databases that are needed to be upgraded simultaneously in a single upgrade.

Similarly, the work database 215 includes a single row for each job. The machine database 225 may include a row for each physical machine, VM, farm, and the like. For example, machine manager database 225 may include a version string. According to an embodiment, each VHD, Farm, and VM within a network has an associated version string.

According to one embodiment, the cloud manager includes a simple logging system that may be configured to record a log entry for each web service call. A logging system may be implemented that includes as few/many features as desired. Generally, the logging system is used for measuring usage and performance profiling.

According to an embodiment, the Web Service APIs 240 are built using SOAP with ASP.net. The various Web Methods in the APIs follow two main patterns—Gets and Updates.

Generally, the update methods take a data structure as the input and return the same structure as the output. The output structure returns the current state of the underlying object in the database, potentially differing from the input object if validation or other business logic changed some properties or else with additional properties filled in (for example record IDs or other values calculated by the cloud manager). The update methods are used for initial object creation as well as subsequent updates. In other words, callers to the web service APIs 240 can simply request the configuration they want and they don't need to keep track of whether the object already exists or not. In addition this means that updates are idempotent in that the same update call can be made twice with the identical effect to making it only once. According to an embodiment, an update method may include a LastUpdated property. When the LastUpdated property is present, the cloud manager 200 rejects the Update if the value of LastUpdate does not match the one currently stored in the database. Some Update methods include properties that are set on the first invocation of the method and are not set on other invocations of the method.

Cloud manager 200 is configured to avoid the use of callbacks. Since callbacks may be unreliable, clients interacting with cloud manager 200 may check object status using a web service API when they want to check a status of an update. According to an embodiment, a call to an update method causes cloud manager 200 to set the state of the underlying object to "Provisioning" and when the updates are completed the state is set to "Active".

Figure 3:
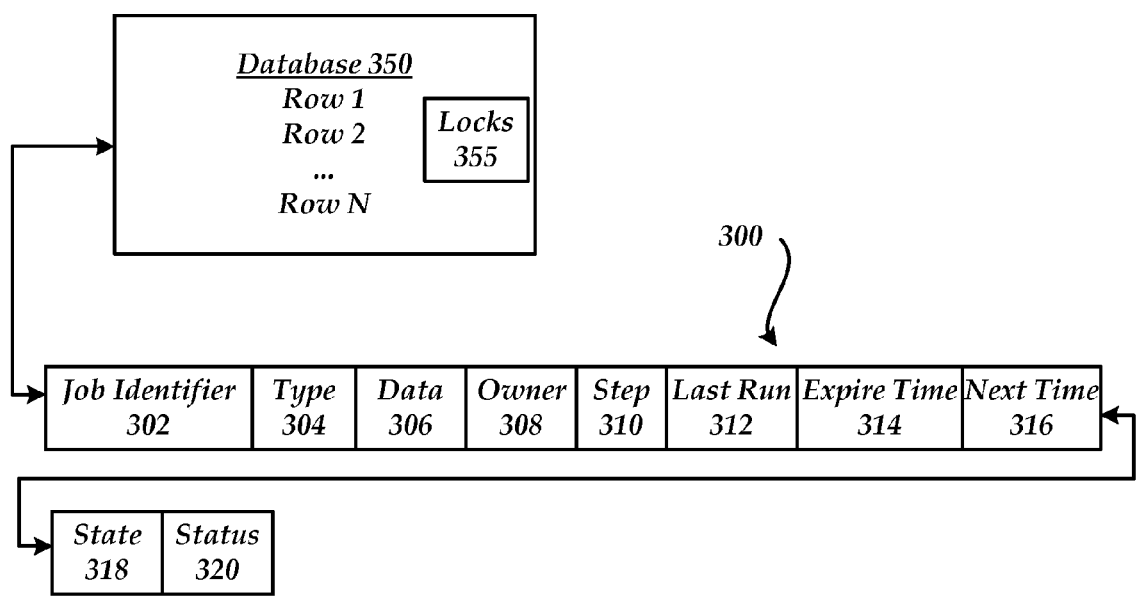
FIG. 3 shows an exemplary job record stored within a row of a database.

FIG. 3 shows an exemplary job record stored within a row of a database. As illustrated, record 300 comprises job identifier 302, type 304, data 306, owner 308, step 310, last run 312, expire time 314, next time 316, state 318 and status 320.

Generally, for each task that is requested to be performed, the cloud manager creates a record in database 350 (e.g. work database 215 in FIG. 2).

Job identifier 302 is used to specify a unique identifier for the requested task.

Type 304 specifies the task to perform. For example, the type may include a name of the script to be executed. For example, when the task is to run the script named "DeployVM.ps1" then the data 306 may include the identifier (e.g. "–VMID 123"). This allows new task types to be added to the system without requiring any changes to compiled or other binary parts of the system.

Data 306 is used to store data that is associated with the task. For example, the data may be set to the tenant, machine, network, VM, etc. on which the task is to be performed. The data 306 may also store one or more values to which a value in a database is set. The process running the task may look to the job record to see what value the desired number of machines is set to. The script uses the value in the database to perform the operation.

Owner 308 specifies a process/machine that is executing the process. For example, when a cloud manager machine starts execution of a job, the machine updates the owner 308 portion of the record with an ID of the machine.

Step 310 provides an indication of a step of the current script. For example, the script may divide a task into any number of steps. As the process completes a step of the script, step 310 is updated. A process may also look at step 310 to determine what step to execute in the script and to avoid having to re-execute previously completed steps.

Last run 312 provides a time the script was last started. Each time a script is started, the last run time is updated.

Expire time 314 is a time that indicates when the process should be terminated. According to an embodiment, the expire time is a predetermined amount of time (e.g. five minutes, ten minutes . . . ) after the process is started. The expire time may be updated by a requesting process through the web service API.

Next time 316 is a time that indicates when a task should next be executed. For example, a process may be stopped after completion of a step and be instructed to wait until the specified next time 316 to resume processing.

State 318 indicates a current state and Status 320 indicates a status of a job (e.g. Created, Suspended, Resumed, Executing, Deleted).

Duplicate rows in the database can be removed before they are performed if they have the same task type and data values. For example, multiple requests may be made to perform the same task that are stored in multiple rows of the database.

A job can have one or more locks 355 associated with it. If locks are not available then a job will not be scheduled to run until the locks are available. The locks may be configured in many different ways. For example, the locks may be based on a mutex, a semaphore, and the like. Generally, a mutex prevents code from being executed concurrently by more than one thread and a semaphore restricts a number of simultaneous uses of a shared resource up to a maximum number. According to an embodiment, a lock is a character string that represents a resource. The resource may be any type of resource. For example, the lock may be a farm, a machine, a tenant, and the like. Generally, the locks are used to defer execution of one or more tasks. Each job may specify one or more locks that it needs before running. A job may release a lock at any time during its operation. When there is a lock, the job is not scheduled. A job needing more than one lock requests all locks required at once. For example, a job already in possession of a lock may not request additional locks. Such a scheme assists in preventing possible deadlock situations caused by circular lock dependencies amongst multiple jobs.

Figure 4:
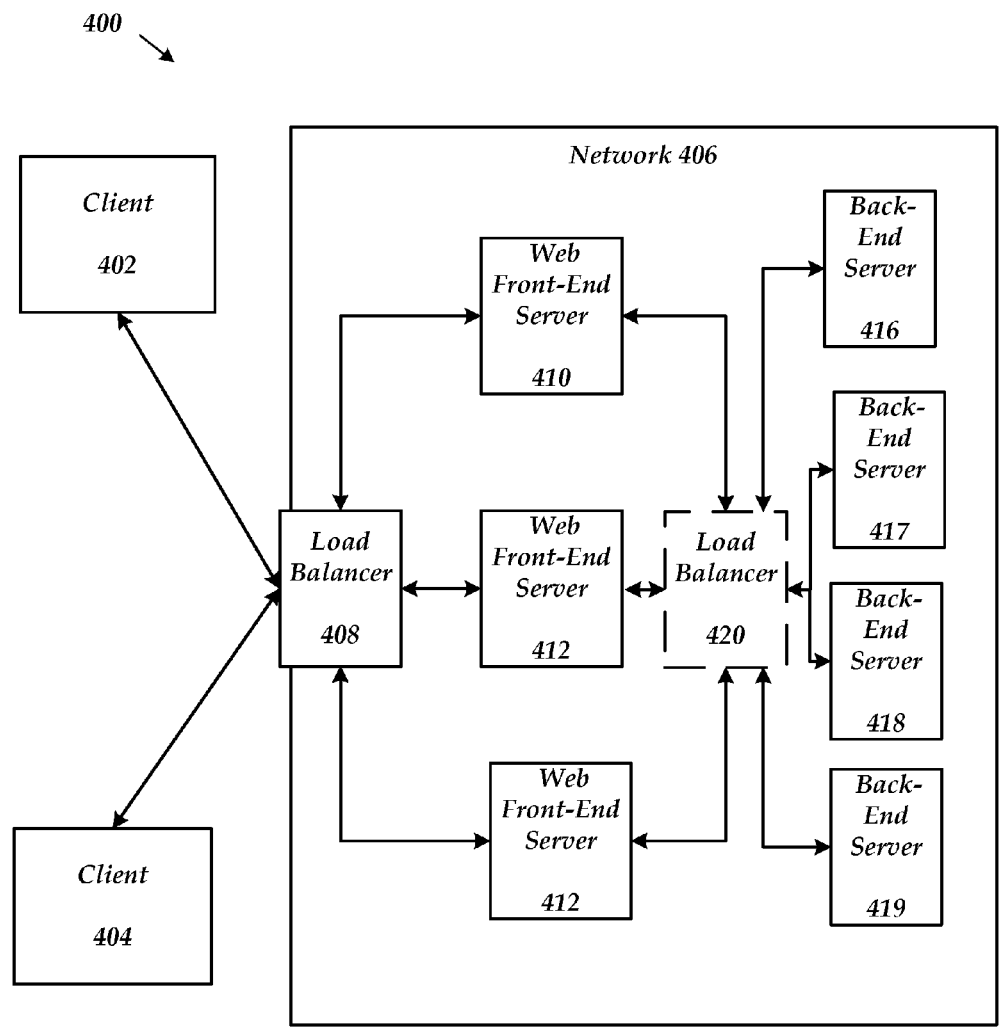
FIG. 4 shows an example system for a network including front-end and back-end servers for an online service.

FIG. 4 shows an example system 400 for a network including front-end and back-end servers for an online service. The example system 400 includes clients 402 and 404, network 406, load balancer 408, WFE servers 410, 412, 414 and back-end servers 416-419. Greater or fewer clients, WFEs, back-end servers, load balancers and networks can be used. Additionally, some of the functionality provided by the components in system 400 may be performed by other components. For example, some load balancing may be performed in the WFEs.

In example embodiments, clients 402 and 404 are computing devices, such as desktop computers, laptop computers, terminal computers, personal data assistants, or cellular telephone devices. Clients 402 and 404 can include input/output devices, a central processing unit ("CPU"), a data storage device, and a network device. In the present application, the terms client and client computer are used interchangeably.

WFEs 410, 412 and 414 are accessible to clients 402 and 404 via load balancer 408 through network 406. As discussed, the servers may be configured in farms. Back-end server 416 is accessible to WFEs 410, 412 and 414. Load balancer 408 is a dedicated network device and/or one or more server computers. Load balancer 408, 420, WFEs 410, 412 and 414 and back-end server 416 can include input/output devices, a central processing unit ("CPU"), a data storage device, and a network device. In example embodiments, network 406 is the Internet and clients 402 and 404 can access WFEs 410, 412 and 414 and resources connected to WFEs 410, 412 and 414 remotely.

In an example embodiment, system 400 is an online, browser-based document collaboration system. An example of an online, browser-based document collaboration system is Microsoft Sharepoint® from Microsoft Corporation of Redmond, Wash. In system 400, one or more of the back-end servers 416-419 are SQL servers, for example SQL Server from Microsoft Corporation of Redmond, Wash.

WFEs 410, 412 and 414 provide an interface between clients 402 and 404 and back-end servers 416-419. The load balancers 408, 420 direct requests from clients 402 and 404 to WFEs 410, 412 and 414 and from WFEs to back-end servers 416-419. The load balancer 408 uses factors such as WFE utilization, the number of connections to a WFE and overall WFE performance to determine which WFE server receives a client request. Similarly, the load balancer 420 uses factors such as back-end server utilization, the number of connections to a server and overall performance to determine which back-end server receives a request.

An example of a client request may be to access a document stored on one of the back-end servers, to edit a document stored on a back-end server (e.g. 416-419) or to store a document on back-end server. When load balancer 408 receives a client request over network 406, load balancer 408 determines which one of WFE server 410, 412 and 414 receives the client request. Similarly, load balancer 420 determines which one of the back-end servers 416-419 receive a request from the WFE servers. The back-end servers may be configured to store data for one or more tenants (i.e. customer).

Figure 5:
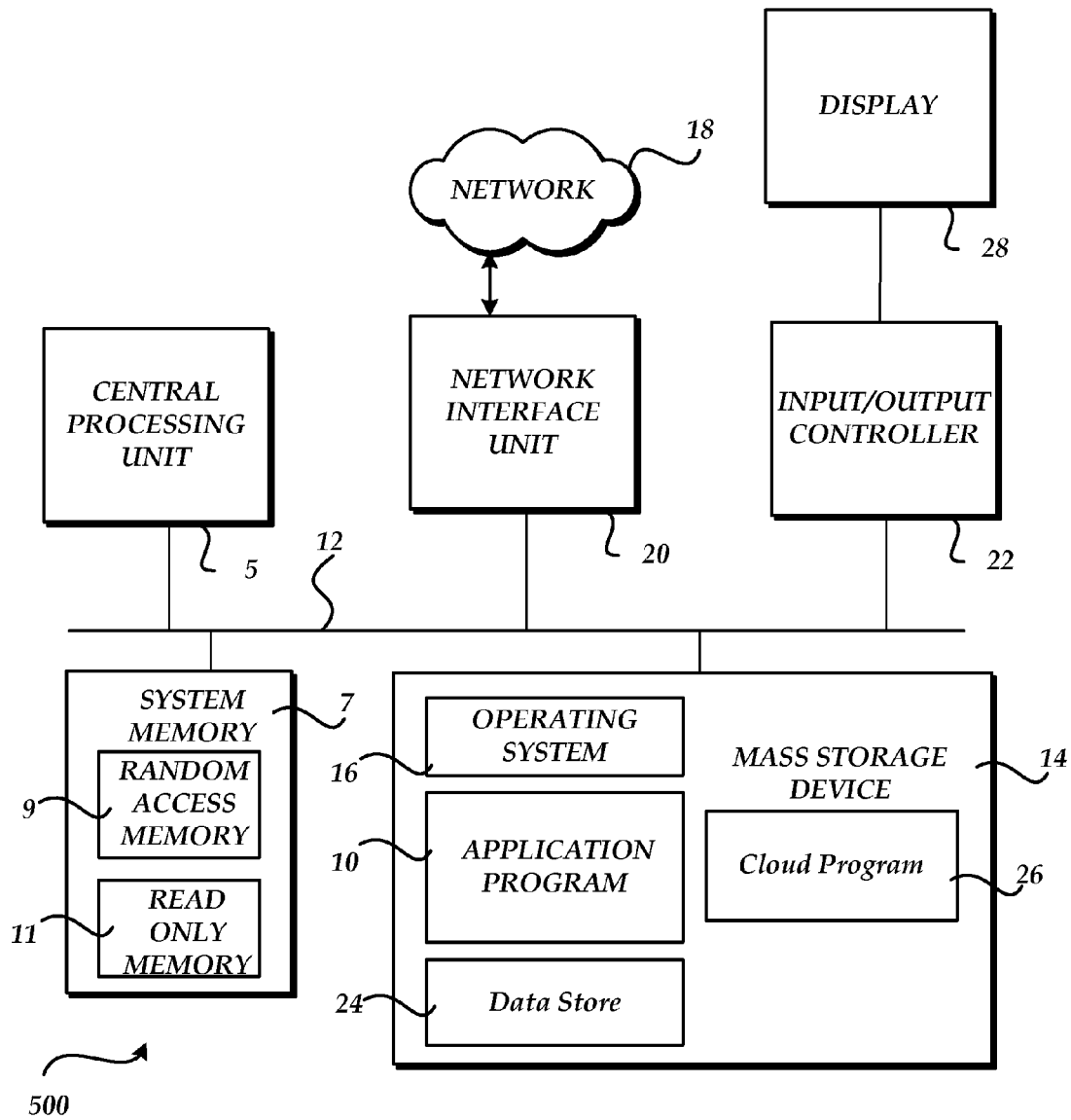
FIG. 5 illustrates a computer architecture for a computer.

Referring now to FIG. 5, an illustrative computer architecture for a computer 500 utilized in the various embodiments will be described. The computer architecture shown in FIG. 5 may be configured as a server, a desktop or mobile computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 500 further includes a mass storage device 14 for storing an operating system 16, application programs 10, data store 24, files, and a cloud program 26 relating to execution of and interaction with the cloud system 100.

The mass storage device 14 is connected to the CPU 5 through a mass storage controller (not shown) connected to the bus 12. The mass storage device 14 and its associated computer-readable media provide non-volatile storage for the computer 500. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 500.

According to various embodiments, computer 500 may operate in a networked environment using logical connections to remote computers through a network 18, such as the Internet. The computer 500 may connect to the network 18 through a network interface unit 20 connected to the bus 12. The network connection may be wireless and/or wired. The network interface unit 20 may also be utilized to connect to other types of networks and remote computer systems. The computer 500 may also include an input/output controller 22 for receiving and processing input from a number of other devices, including a keyboard, mouse, or electronic stylus (not shown in FIG. 5). Similarly, an input/output controller 22 may provide output to a display screen 28, a printer, or other type of output device.

As mentioned briefly above, a number of program modules and data files may be stored in the mass storage device 14 and RAM 9 of the computer 500, including an operating system 16 suitable for controlling the operation of a networked computer, such as the WINDOWS® operating systems from MICROSOFT® CORPORATION of Redmond, Wash. The mass storage device 14 and RAM 9 may also store one or more program modules. In particular, the mass storage device 14 and the RAM 9 may store one or more application programs, such as cloud program 26, that perform tasks relating to the cloud system.

Figure 6:
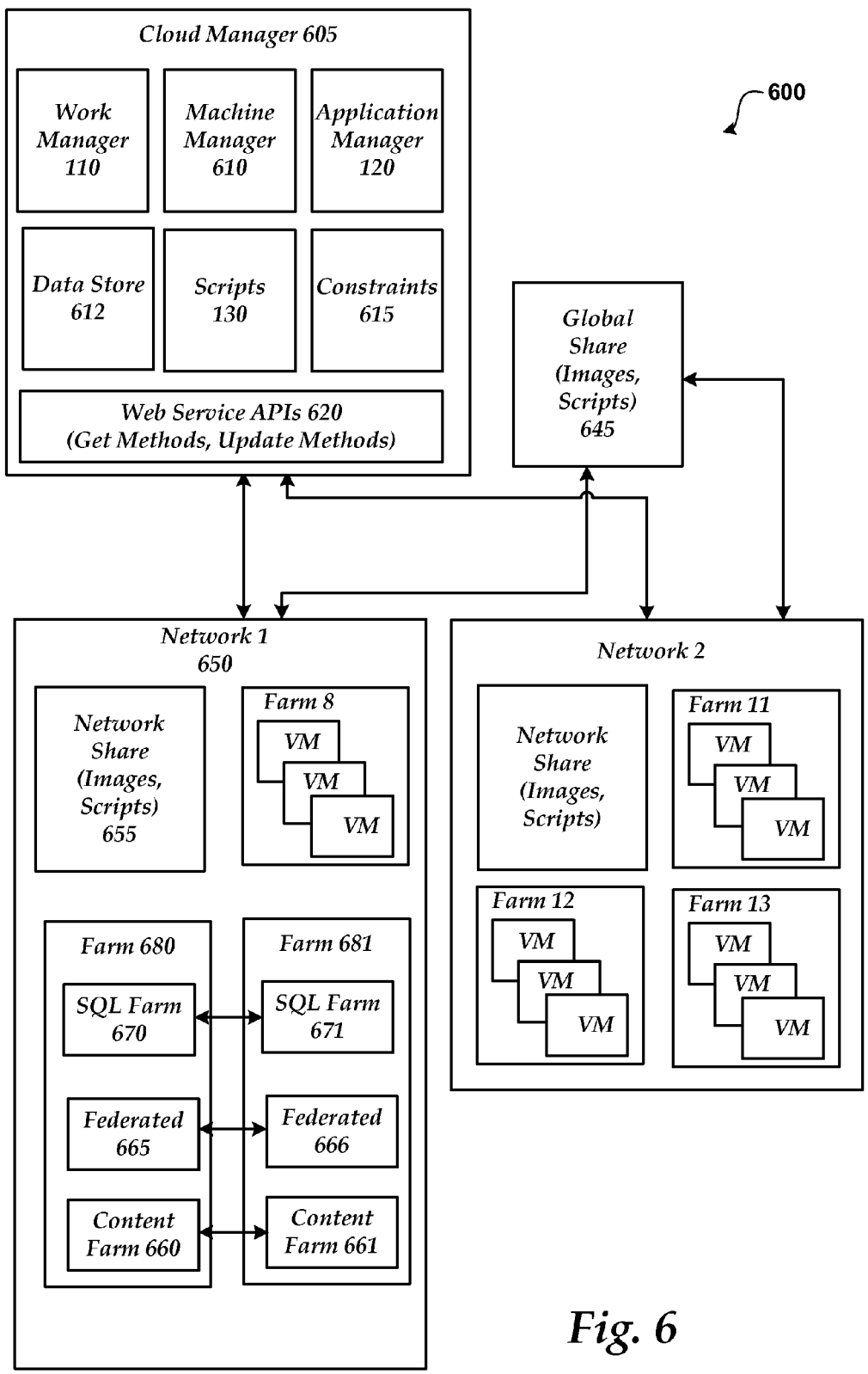
FIG. 6 shows a machine manager controlling and managing a deployment of objects on hosts using hard and soft constraints.

FIG. 6 shows a machine manager controlling and managing a deployment of objects on hosts using hard and soft constraints. As illustrated, system 600 shows a cloud manager 605 comprising work manager 110, machine manager 610, application manager 120, data store 612, scripts 130, constraints 615, and web service APIs 620. Machine manager 610 is used to determine object placement and hosts and controls the automatic deployment of the objects across different networks (Network 1, Network 2). While only two networks are shown, many more networks are generally managed (e.g. ten, one hundred, one thousand, ten thousand, and the like). Cloud manager 605 operates and is configured similarly to the cloud manager system shown and described above. According to an embodiment, machine manager 610 is configured to manage and deploy objects on hosts (e.g. deployment of physical and virtual machines, databases, and the like) that are used in an online content collaboration service, such as a SHAREPOINT ONLINE service. For example, machine manager 610 may place VMs on physical machines, DBs on SQL servers, and the like. Application manager 120 may place tenants in DBs/Farms, tenants in directories, and the like. Generally, a manager may place any type of object on any type of host. Machine manager 610 may be used to deploy objects and manage machines for other online services.

Machine manager 610 understands the physical topology of the networks and keeps track of the location of the physical machines and virtual machines which are members within each of the networks. Machine manager 610 knows a location of each rack within the networks and each machine that is located within the rack. Machine manager 610 also keeps track of the specific versions of software that is being used on each of the machines as well as the Virtual Machine (VM) Images that are installed on each of the machines. Each VM image corresponds to a different server role.

Machine manager 610 is also configured to determine the roles for each of the machines (physical and virtual) within each of the farms. This determination may be performed manually and/or dynamically. For example, a network may be initially defined to include fifteen physical machines and a number of virtual machines, five of which are grouped as a content farm 660, five in a federated services farm 665, and five in a SQL farm 670. During operation of the online service, machine manager 610 may collect performance characteristics relating to the farms and machines within a network and dynamically adjust the resources of the network based on the collected performance characteristics. For example, when it is determined that a content farm is overloaded, machine manager 610 may create a job that deploys another virtual machine within the content farm to provide additional capacity. The health of the machines/networks may also be monitored. Machine manager 610 may replace machines within a network, direct traffic to a new set of machines, and/or perform some other actions in response to the determination of the health of the machines. For example, if one or more virtual machines go down, machine manager 610 deploys a new virtual machines and directs the traffic to the newly deployed machines.

Machine manager 610 keeps track of virtual machines which are the actual servers that do the work of the service and stores this information in a data store, such as within a database within data store 612. As discussed, each of the VMs have a specific role representing the function of the specific server and they are further grouped into farms which are typically a group of machines running the exact same version of the software that work together.

When new software is available, machine manager 610 manages the deployment of the new software. Generally, individual machines within a farm/network are not upgraded or patched. Instead, machine manager 610 starts jobs managed by the work manager 110 that deploys new machines and farms that include the new software. After the new farm is configured with the new software, machine manager 610 moves the traffic/load to the new farm and stops the traffic from going to the old farm.

A data store, e.g. data store 612 is configured to store information about patches and Virtual Hard Disk (VHD) images that reside on data stores in the various remote networks and are in use and/or are to be deployed on one or more of the machines in one or more of the networks. According to an embodiment, the MICROSOFT® VHD file format is used that specifies a virtual machine hard disk that can reside on a native host file system encapsulated within a single file. Images that are used within a specific network may be moved to a global share 645 and/or to a network share that is local to a network (e.g. network share 655).

According to an embodiment, machine manager 610 doesn't actually install the software on the machines. Instead, as discussed previously, a job is placed in a job queue that when executed performs actions to complete the task. Once the images are installed on the machines, machine manager 610 starts the machine running. Zero or more role-specific scripts that can do role-specific customizations of the deployment may be run after the Virtual Machine is started. These scripts may be located within the network's share (e.g. network share 655), a global share 645, scripts 630 or some other location.

During configuration, a process executing a script is provided with the required password(s) to set up and deploy a machine. For example, when a process to deploy a farm is executed, the passwords are supplied to the deploy farm process so that the farm may be configured and started. During the installation of the images and any customizing of the configuration, the farm is not connected to the online service and as such does not have any traffic. Once traffic is directed to the farm, the machine is locked down and the passwords are not accessible on the machine or through a web interface.

Before machine manager creates the job to deploy a new virtual machine it chooses a location for the new virtual machine. Machine manager 610 is configured to use placement constraints (e.g. constraints 615) that comprise hard and soft constraints when determining where to place objects on hosts within the online system. A host is an entity that includes objects. For example, a host may be a physical machine, a database, a farm, a forest, and the like. An object is an entity that exists on a host. For example, an object may be a virtual machine, a tenant, a database, a user, and the like. Objects and hosts have a many-to-one relationship. A host may contain many objects but each object belongs to one host.

When an object is to be placed (i.e. during deployment, reconfiguration), machine manager 610 attempts to place the object on a host that meets the hard constraints and is prioritized by the soft constraints. Hard constraints eliminate hosts from the selection pool of hosts that are not suitable for the object being placed. Soft constraints are priorities that determine which hosts are more suitable than other hosts for object placement.

Constraints may also be categorized. For example, there may be high availability constraints and performance constraints. High availability constraints are used to help in providing an overall availability of the online service when a host fails. For example, a high availability constraint may specify that a virtual machine is to be placed on a host not already having a VM of the same role and in the same farm. Performance constraints are used to help in preventing a host from being overloaded with objects such that it becomes a bottleneck.

As discussed, the online service managed by cloud manager 605 is configured to be highly available. For example, each resource for the online system may be deployed with redundancy. There may be any number of redundant deployments of a resource. For example, there may be two, ten, twenty, one hundred and the like redundant resources.

Machine manager 610 uses constraints 615 to help ensure that redundant resources (e.g. roles within a farm and network) are placed on hosts (e.g. physical machines) in a manner that avoids having a single point of failure. For example, placing all of the machines of a farm within a single rack would be a single point of failure. When possible, a single point of failure is attempted to be avoided. For example, when multiple racks are available, the machines in the farm are spread across the racks.

Similarly, VMs that are performing a same role for a farm should be hard constrained to different physical machines. Redundant VM roles within a farm are used with the intent of providing high availability to the farm. Since physical machines are considered single-points-of-failure, any roles within a farm which are redundant may be constrained to be placed on different physical machines. In this way, the roles performed by the VMs are spread across physical machines thereby reducing an impact of a physical machine failure.

Machine manager 610 applies the constraints to hosts to determine how to place objects onto hosts that follow a high availability model that includes hard constraints and optimizations. Hard constraints may include many different constraints. The following are exemplary hard constraints that may be used when placing an object on a host. More or fewer hard constraints may be used.

A same network restraint specifies that the host is located within the same network as the farm where the object is to be deployed. Physical machines are associated with one of the networks (e.g. Network 1, Network 2). Objects that are hosted on the physical machines should belong to a farm that is within the network. For example, VMs that are hosted on the machines are to belong to a farm that lives within that network.

A correct type constraint specifies that the host is of the correct type to handle the object. Physical machine types are defined to accommodate different hardware SKUs and configurations for certain roles. For example, there may be physical machines designed for SQL, certain roles of VMs, deployment of databases, and the like.

A running constraint specifies that the host is in the running state. The deployment of the object will not succeed if the physical machine is not running.

A capacity constraint specifies that the host includes enough capacity to accommodate the object. For example, the object requires a certain level of processing power, memory, storage, and the like.

A redundancy constraint specifies that the host does not already have a same type of object. Certain objects may require the full use of a machine. For example, according to an embodiment, SQL machines require the full performance capability of a physical machine A role constraint specifies that the host does not already have more than a number (e.g. 1, 2, . . . ) of objects that performs a same role. Redundant Roles within a farm and network are a mechanism by which high availability is achieved within a farm. This hard constraint helps to ensure that farms can remain available to the online service in the event of a physical machine failure. As another embodiment, two web front end servers are supported on the same physical machine, but a third virtual machine of a different type can also share the same machine.

A backup constraint specifies that the host does not already host a role that may be used as a backup. For example, certain roles may be able to perform the tasks of another role if one of the roles is unavailable (e.g. provisioning tasks take place on the CCA, but failback to CCT machines in the event that the CCA is unavailable).

In addition to the hard-constraints there may be any number of soft constraint optimizations that can be applied to assist in placing an object on a host. According to an embodiment, the soft constraints are designed primarily to spread the objects across hosts to lean towards a better performing system as a whole, rather than maximizing for utilization. In other words, instead of trying to place as many VMs as possible onto a host, preference is given to empty hosts. Depending on the requirements of the system, this preference may change.

Some exemplary soft constraints for an online service include: that objects of a same type should reside on different hosts; that the host should have as much free resources as possible; that the host should reside on a rack that does not already include an object of the same type and role; that a host should not already have a VM of the same role; that a host should be placed on a latest available version of a physical machine; that the object should be placed on a host with the most processing available; and the like. The soft constraints may be ordered and prioritized to assist in the selection of a host. For example, placing the object on a host that has the most available resources (e.g. one or more of processing power, memory, storage) may be prioritized the highest such that objects utilize all of the available hosts.

When there is more than one object to place, machine manager 610 may use characteristics to determine an order of placing the objects. For example, a size of the object may be used, a role of the object, a type of the object, and the like may be used to determine an order. For example, in order to help prevent a condition where many small sized objects (e.g. VMs, tenants) have been placed on hosts and there is no longer any room to place larger sized objects, the objects may be ordered from smallest to largest.

These soft constraints act as placement prioritizations and are intended to take the list of candidate hosts that satisfy the hard-constraints and filter them down through as many soft constraints as possible until the point is reached where a 'best choice' remains. In the event that there are multiple candidate machines available even after all criteria have been applied, one of those may be randomly selected or selected based on different criteria. Even when a host does not meet an expectation of a soft constraint, the object will still be placed on a host since the soft constraints are used to prioritize placement and not prevent placement.

When a hard constraint can not be satisfied, cloud manager 605 may throw an exception indicating that the deployment cannot succeed with details of which constraint(s) could not be met as defined by the hard constraints. The exception may indicate that auto-placement logic was unable to find a host that met all of the required placement constraints.

Figure 7:
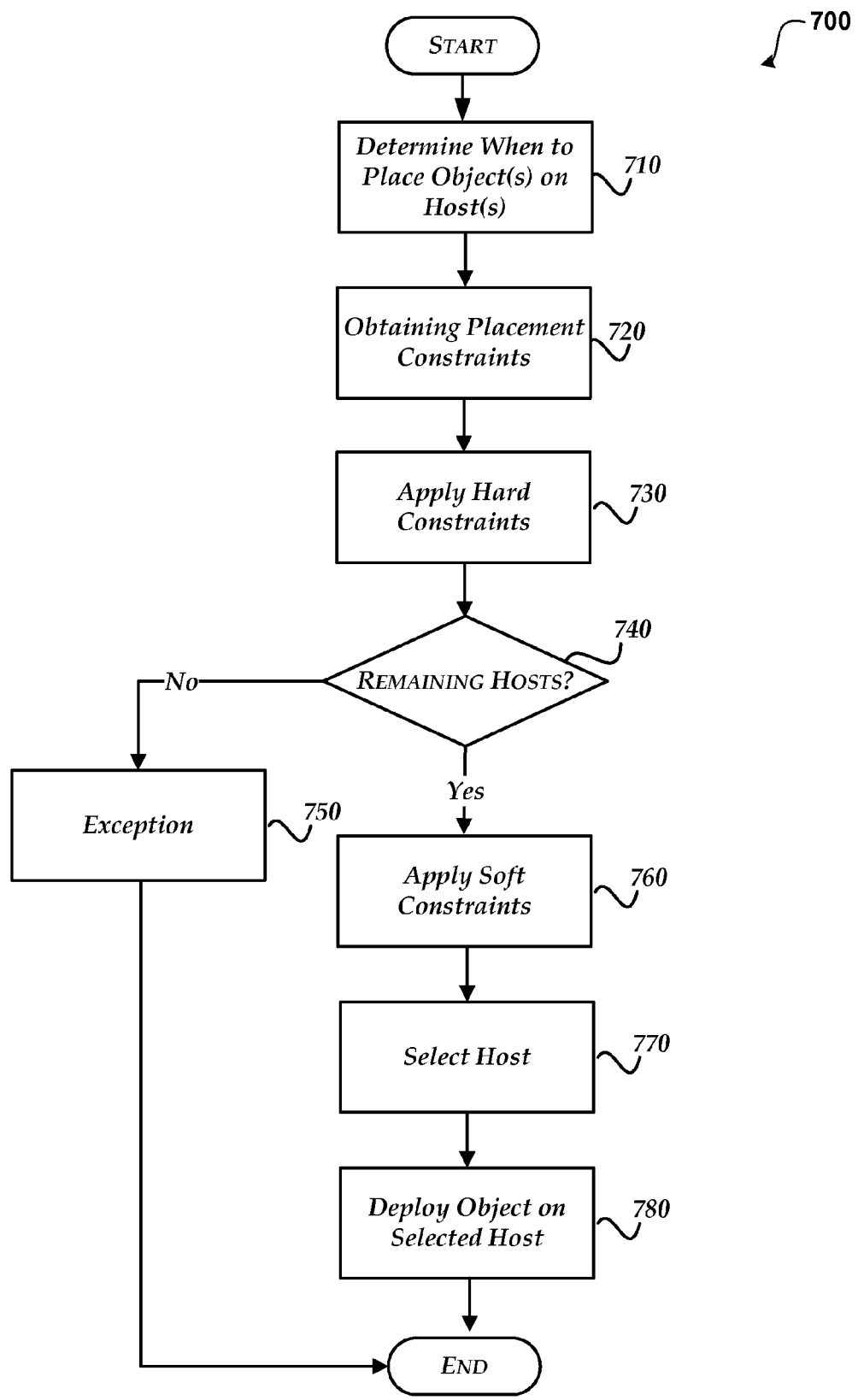
FIG. 7 shows a process for using hard and soft constraints to place objects on hosts.

Referring now to FIG. 7 a process for using hard and soft constraints to place objects on hosts will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Referring to FIG. 7, after a start operation, the process 700 flows to operation 710, were a determination is made to place an object on a host. An object may be deployed for many different reasons. For example, one or more farms may be deployed, a new network may be deployed, a machine may be added, a database may be added, a tenant may be added, and the like. The determination may occur from a request through an API, such as a Web Service API as described above, and/or may be determined automatically. For example, when the goals of a farm change, a new farm may be manually/automatically deployed and objects may be placed on the hosts of the farm automatically. A host is any entity that includes objects. For example, a host may be a physical machine, a database server, a database, a farm, an Microsoft Active Directory forest, and the like. An object is an entity that exists on a host. For example, an object may be a virtual machine, a tenant, a database, a user, and the like.

Moving to operation 720, the placement constraints for placing the object are obtained. The placement constraints are used to determine suitable and preferred hosts for placing an object. According to an embodiment, the constraints comprise hard constraints and soft constraints. Hard constraints eliminate hosts from the pool of hosts that are not suitable for the object being placed. Soft constraints are priorities that determine which hosts are more suitable than other hosts for object placement. The constraints may be obtained from a data store and/or obtained through another manner. For example, the constraints may be received through an API as described.

Flowing to operation 730, a pool of available hosts are filtered by applying the hard constraints. According to an embodiment, the hard constraints are directed at providing an overall availability of the online service even when a host fails. The pool of hosts to use may be determined in different manners. For example, the pool of hosts may contain all of the existing hosts, or it may contain all hosts that meet an initial criteria.

Moving to decision operation 740, a determination is made as to whether there are any remaining hosts after applying the hard constraints. When there are not any remaining hosts, the process moves to operation 750, where an exception is thrown indicating that there are no available hosts that meet the defined constraints. When there are remaining hosts, the process moves to operation 760.

At operation 760, the soft constraints are applied against the pool of remaining hosts. The soft constraints are used to select an optimal host from the pool of remaining hosts. According to an embodiment, the soft constraints are designed primarily to spread the placement of objects across hosts to lean towards a better performing system as a whole, rather than maximizing a single host(s) for utilization.

Moving to operation 770, a host is selected. The host may be selected many different ways. For example, the host may be selected based on a prioritization of the hosts made from the applied soft constraints. The host may also be randomly selected from the remaining hosts.

Flowing to operation 780, the object is deployed on the selected host. A job may be requested within the cloud system, such that the process to deploy the object on the host is started. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for placing objects on hosts in an online service, comprising:
   determining, using a processor, when to place an object on one of a plurality of hosts in the online service, wherein the online service comprises databases, virtual machines (VMs) and physical machines, wherein the physical machines are arranged in farms that perform roles in a network;
   obtaining placement constraints for the object that comprise hard constraints and soft constraints, wherein application of a hard constraint eliminates one or more of the hosts from being selected on which to place the object, and wherein soft constraints determine which hosts are more suitable than other hosts;
   applying the hard constraints against hosts within the network that results in a pool of remaining hosts, wherein the hard constraints include high availability constraints, wherein applying the high availability constraints eliminates one or more hosts to ensure that objects having redundant roles within the network are placed on different hosts;
   applying the soft constraints against the pool of remaining hosts that results in a pool of selection hosts;
   automatically selecting a host on which to place the object from the pool of selection hosts; and
   automatically deploying the object on the selected host.

2. The method of claim 1, wherein the object is at least one of: a virtual machine (VM), a tenant or a database.

3. The method of claim 1, wherein the selected host is at least one of: a physical machine, a database, a farm, a rack that holds physical machines, or a virtual machine (VM).

4. The method of claim 2, wherein when the object is a VM and the plurality of hosts are physical machines, applying the hard constraints comprises applying two or more of the following constraints against each host: host is located within the same network as the farm the VM is being deployed for; host is of the correct type based on a role of the VM; host is in the running state; the host includes capacity to accommodate the VM; or host does not already have a VM of the same role and farm.

5. The method of claim 1, wherein the constraints are used to prevent any one of the hosts from being overloaded with objects.

6. The method of claim 1, wherein when the object is a virtual machine and the plurality of hosts are physical machines, the hard constraints comprise applying two or more of the following constraints against each host: host is of a correct type; host is in the running state; host includes capacity to accommodate the object; or host does not already have an object of the same type.

7. The method of claim 1, wherein the soft constraints are optimizations that when applied to the pool of remaining hosts spread the deployment of objects of a same type across different hosts.

8. The method of claim 1, wherein objects of a larger size are placed before objects having a smaller size.

9. The method of claim 1, wherein the hard constraints further include performance constraints.

10. A computer-readable storage medium, excluding a signal, having computer-executable instructions for deploying objects on hosts in an online service, comprising:
    determining when to place an object on one of a plurality of hosts in the online service, wherein the online service comprises databases, virtual machines (VMs) and physical machines, wherein the physical machines are arranged in farms that perform roles in a network; wherein the object to be placed on one of the plurality of hosts is at least one of: a virtual machine (VM), a tenant or a database; wherein the host is at least one of: a physical machine, a database, a farm, a rack that holds physical machines, or a VM;
    obtaining placement constraints for the object that comprise hard constraints and soft constraints, wherein application of a hard constraint eliminates one or more of the hosts from being selected on which to place the object, wherein soft constraints determine which hosts are more suitable than other hosts;
    applying the hard constraints against hosts within the network that results in a pool of remaining hosts, wherein the hard constraints include high availability constraints, wherein applying the high availability constraints eliminates one or more hosts to ensure that objects having redundant roles within the network are placed on different hosts;
    applying the soft constraints against the pool of remaining hosts that results in a pool of selection hosts;
    automatically selecting a host on which to place the object from the pool of selection hosts; and
    automatically deploying the object on the selected host.

11. The computer-readable storage medium of claim 10, wherein when the object is a VM and the plurality of hosts are physical machines, applying the hard constraints comprises applying two or more of the following constraints against each host: host is located within the same network as the farm the VM is being deployed for; host is of the correct type based on a role of the VM; host is in the running state; the host includes capacity to accommodate the VM; or host does not already have a VM of the same role and farm.

12. The computer-readable storage medium of claim 10, wherein when the object is a tenant and the plurality of hosts are physical machines, the hard constraints comprise applying two or more of the following constraints against each host: host is of a correct type; host is in the running state; host includes capacity to accommodate the database; or host does not already have a database of the same type.

13. The computer-readable storage medium of claim 10, wherein the soft constraints are optimizations that when applied to the pool of remaining hosts spread the deployment of objects of a same type across different hosts.

14. The computer-readable storage medium of claim 10, wherein objects of a larger size are placed before objects having a smaller size.

15. The computer-readable storage medium of claim 10, wherein the hard constraints further include performance constraints.

16. A system for deploying objects on hosts for an online service, comprising:
   a network comprising physical machines, racks for holding physical machines, virtual machines (VMs), servers, and databases; wherein the servers are arranged in farms that each perform a role;
   a processor and a computer-readable storage medium;
   an operating environment stored on the computer-readable storage medium and executing on the processor; and
   application code that is operative to:
      determine when to place an object on one of a plurality of hosts; wherein the object to be placed on one of the plurality of hosts is at least one of: a virtual machine (VM), a tenant or a database; wherein the host is at least one of: a physical machine, a database, a farm, a rack or a VM;
      obtain placement constraints for the object that comprise hard constraints and soft constraints, wherein application of a hard constraint eliminates one or more of the hosts from being selected on which to place the object, wherein soft constraints determine which hosts are more suitable than other hosts;
      apply the hard constraints against hosts within the network that results in a pool of remaining hosts, wherein the hard constraints include high availability constraints, wherein applying the high availability constraints eliminates one or more hosts to ensure that objects having redundant roles within the network are placed on different hosts;
      apply the soft constraints against the pool of remaining hosts that results in a pool of selection hosts;
      automatically select a host on which to place the object from the pool of selection hosts; and
      automatically deploy the object on the selected host.

17. The system of claim 16, wherein when the object is a VM and the plurality of hosts are physical machines, applying the hard constraints comprises applying two or more of the following constraints against each host: host is located within the same network as the farm the VM is being deployed for; host is of the correct type based on a role of the VM; host is in the running state; the host includes capacity to accommodate the VM; or host does not already have a VM of the same role and farm.

18. The system of claim 16, wherein when the object is a database and the plurality of hosts are SQL server machines, the hard constraints comprise applying two or more of the following constraints against each host: host is of a correct type; host is in the running state; or host includes capacity to accommodate the database.

19. The system of claim 16, wherein the soft constraints are optimizations that when applied to the pool of remaining hosts spread the deployment of objects of a same type across different hosts.

20. The system of claim 16, wherein the hard constraints further include performance constraints.

* * * * *